United States Patent
Ogaki (10) Patent No.: US 9,172,948 B2
(45) Date of Patent: Oct. 27, 2015

(54) DISPLAY APPARATUS AND METHOD OF CONTROLLING THE SAME FOR DISPLAYING A THREE-DIMENSIONAL VIDEO

(75) Inventor: Koji Ogaki, Koza-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 13/602,945

(22) Filed: Sep. 4, 2012

(65) Prior Publication Data

US 2013/0057662 A1 Mar. 7, 2013

(30) Foreign Application Priority Data

Sep. 7, 2011 (JP) ................. 2011-195060

(51) Int. Cl.
*H04N 13/00* (2006.01)
*H04N 13/04* (2006.01)

(52) U.S. Cl.
CPC ....... *H04N 13/0452* (2013.01); *H04N 13/0497* (2013.01)

(58) Field of Classification Search
CPC  H04N 13/04; H04N 13/0402; H04N 13/0452
USPC ................. 348/552–554, 42, 43, 51–59, 460; 345/419
See application file for complete search history.

(56) References Cited

U.S. PATENT DOCUMENTS

| | | | |
|---|---|---|---|
| 6,549,650 B1* | 4/2003 | Ishikawa et al. | 382/154 |
| 2008/0062069 A1* | 3/2008 | Sinclair et al. | 345/8 |
| 2011/0216166 A1* | 9/2011 | Takahashi et al. | 348/46 |
| 2012/0040759 A1* | 2/2012 | Ito et al. | 463/37 |
| 2012/0169711 A1* | 7/2012 | Penttila et al. | 345/419 |
| 2012/0212576 A1* | 8/2012 | Ikehata et al. | 348/43 |

FOREIGN PATENT DOCUMENTS

| | | |
|---|---|---|
| JP | 2004-109330 A | 4/2004 |
| JP | 2008-42645 A | 2/2008 |
| JP | 2011-166666 A | 8/2011 |

* cited by examiner

*Primary Examiner* — Victor Kostak
(74) *Attorney, Agent, or Firm* — Canon USA Inc. IP Division (57) ABSTRACT

When a user views a three-dimensional video on an external apparatus, the user cannot always simultaneously view the three-dimensional video on another video display apparatus, because of the difference between the display methods used by these apparatuses, for example. In such case, when a three-dimensional video signal is output to the external apparatus, a display unit of the video display apparatus displays a two-dimensional video. In this way, even when the external apparatus is displaying a three-dimensional video, a user can simultaneously view the display unit of the video display apparatus easily.

10 Claims, 5 Drawing Sheets

DISPLAY APPARATUS AND METHOD OF CONTROLLING THE SAME FOR DISPLAYING A THREE-DIMENSIONAL VIDEO

BACKGROUND OF THE INVENTION

1. Field of the Invention

The claimed invention generally relates to displays and, more particularly, to a display apparatus capable of displaying a three-dimensional video signal on a display unit.

2. Description of the Related Art

Recently, various types of three-dimensional video display apparatuses, which can enable a user to recognize a two-dimensional video as a three-dimensional video by utilizing optical illusions based on parallax, have been discussed. As a method of displaying a three-dimensional video, an active shutter method is known. In the active shutter method, a viewer wears glasses having shutters, and a video for the right eye and a video for the left eye are alternately displayed. The shutters are controlled so that the eyes can view only the respective videos. As another method of displaying a three-dimensional video, a polarization method is also known. In the polarization method, a right-eye video and a left-eye video are alternately displayed on every other line on a display, and the lines displaying the right-eye video and to the lines displaying the left-eye video are differently polarized. The glasses are also polarized correspondingly. In this way, each of the right and left eyes recognizes a different video. There is also a method utilizing spectroscopy instead of polarization. In addition, as a method of enabling a user to view a three-dimensional video with naked eyes, a parallax barrier method is known. In the parallax barrier method, a slit barrier is provided on the front side of the display, and each of the right and left eyes recognizes a different video. In addition, a lenticular method is also known. In the lenticular method, many minute lenses are provided on the front side of the display, and each of the right and left eyes recognizes a different video.

In addition, display apparatuses capable of displaying both two-dimensional videos and three-dimensional videos are also known.

For example, Japanese Patent Application Laid-Open No. 2004-109330 discusses a mobile phone including a display unit capable of displaying a three-dimensional image. The mobile phone switches a three-dimensional image display screen to a two-dimensional image display screen according to a key operation other than number keys including # and * keys, a call key, a mail key, and a camera key.

However, an issue remains with these display apparatuses capable of displaying both two-dimensional and three-dimensional videos. For example, when a display apparatus outputs a three-dimensional video signal to an external apparatus, if the display apparatus and the external apparatus use different three-dimensional video display methods, a user cannot simultaneously and accurately view a three-dimensional video displayed by the display apparatus and the external apparatus. This is inconvenient when, for example, the user alternately executes an operation of a personal computer (PC) capable of displaying a three-dimensional video and a check of a video displayed on a large-screen television (TV) connected to the PC. According to the above described conventional technique, a user key operation is used as a trigger to switch the two-dimensional display and the three-dimensional display. However, if a user needs to simultaneously view or alternately check a video displayed on a plurality of display apparatuses capable of displaying three-dimensional videos, it is troublesome to operate each of the display apparatuses.

SUMMARY OF THE INVENTION

According to an aspect of the claimed invention, a display apparatus includes a display unit, a control unit configured to select either a first display mode for causing the display unit to display a three-dimensional video or a second display mode for causing the display unit to display a two-dimensional video, and a connection unit configured to connect the display apparatus to an external apparatus, wherein, if the display apparatus outputs a three-dimensional video to the external apparatus in a state connected to the external apparatus via the connection unit, the control unit sets the second display mode.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

DESCRIPTION OF THE EMBODIMENTS

Various exemplary embodiments, features, and aspects of the claimed invention will be described in detail below with reference to the drawings.

Figure 1:
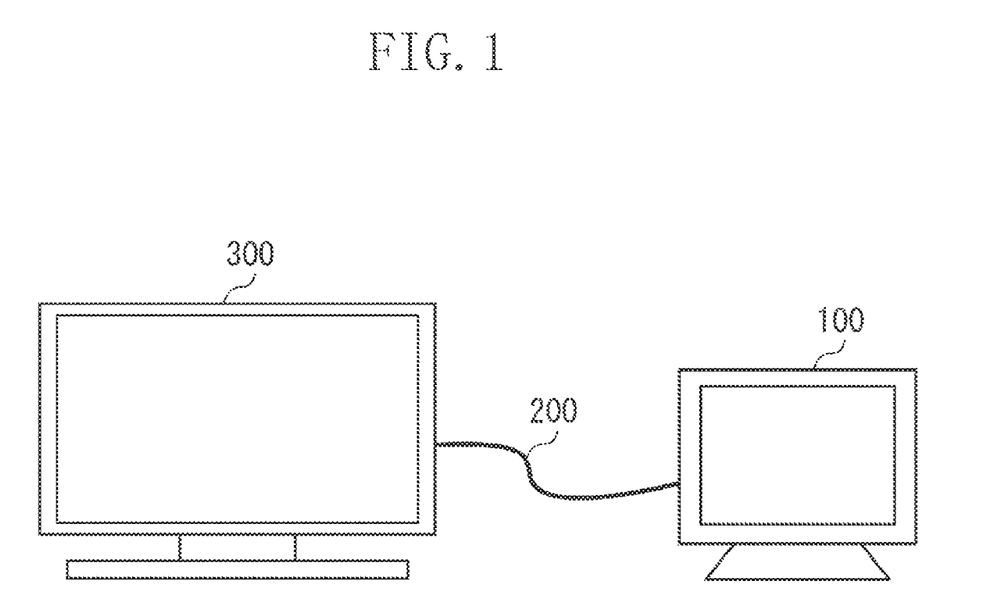
FIG. 1 illustrates an example of a configuration of a PC according to a first exemplary embodiment.

As illustrated in FIG. 1, a first exemplary embodiment of the claimed invention includes a display apparatus 100, a connection cable 200, and an external apparatus 300.

A general personal computer (PC) including a display unit, a control unit, an input unit, and the like can be used as the display apparatus 100. According to the present exemplary embodiment, the PC 100 uses an active shutter method as a three-dimensional video display method. The display unit of the PC 100 has a display mode for displaying a three-dimensional video and a display mode for displaying a two-dimensional video, and a central processing unit (CPU) determines which of the display modes to be set.

The external apparatus 300 is a television receiving apparatus (hereinafter, simply referred to as a TV) capable of receiving a three-dimensional video signal and displaying a three-dimensional video. According to the present exemplary embodiment, the external apparatus 300 uses an active shutter method as a three-dimensional video display method.

The PC 100 and the TV 300 are connected to each other via the connection cable 200, and the PC 100 transmits audio and video data (audio and video signals) to the TV 300. According to the present exemplary embodiment, the connection cable 200 is a high-definition multimedia interface (HDMI) cable compatible with the HDMI standard. While FIG. 1 does not illustrate the internal lines of the HDMI cable, the HDMI cable includes a consumer electronics control (CEC) line for transmitting inter-device control commands, a +5V line for transmitting power source information, a hot plug detect (HPD) for transmitting connection detection information, and the like.

Figure 2:
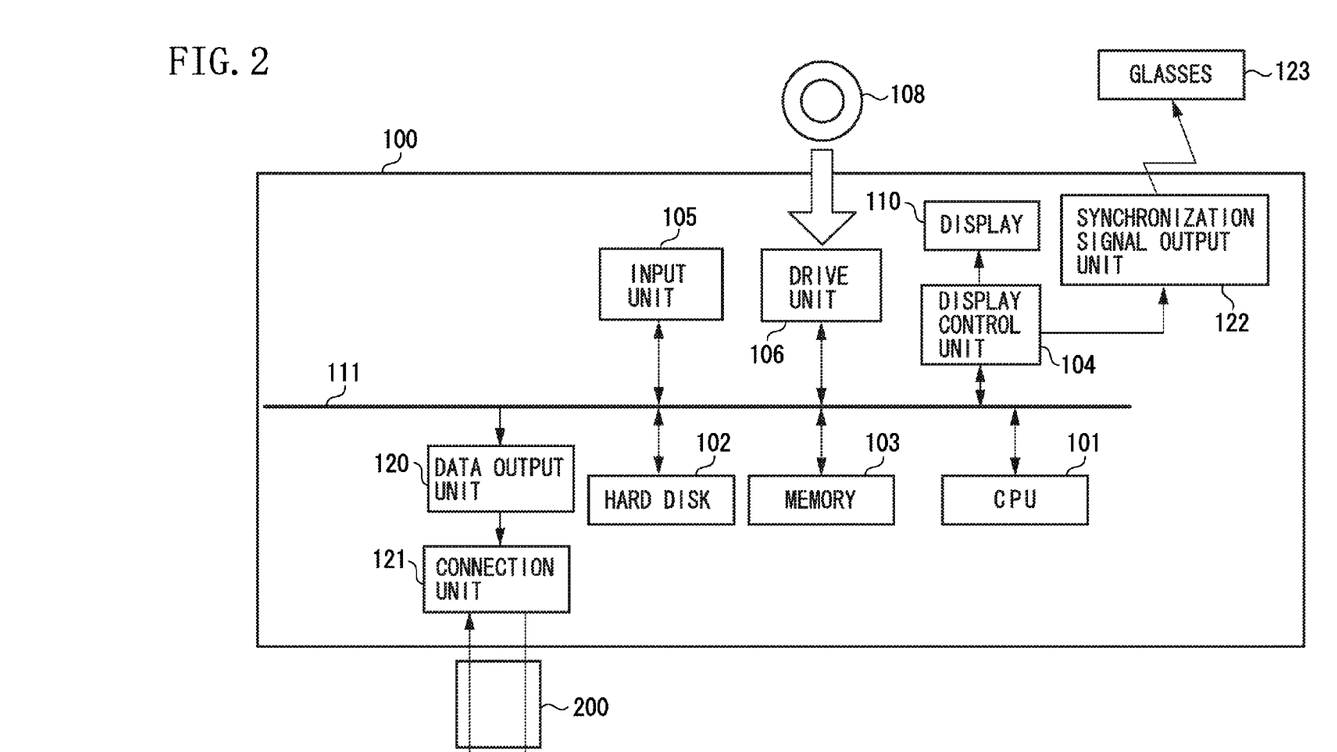
FIG. 2 is a block diagram of the PC according to the first exemplary embodiment.

FIG. 2 is a block diagram illustrating an example of the PC 100 according to the first exemplary embodiment of the claimed invention.

In FIG. 2, a CPU 101, a hard disk 102, a memory 103, a display control unit 104, an input unit 105, a drive unit 106, and a data output unit 120 are connected to an internal bus 111. These units connected to the internal bus 111 can exchange data with each other via the internal bus 111.

The hard disk 102 stores video data, other data pieces, various types of programs for operations of the CPU 101, and the like. The hard disk 102 also stores a program read and executed by the CPU 101 for a control operation according to the present exemplary embodiment.

The memory 103 may include a random access memory, for example. The CPU 101 uses the memory 103 as a work memory and controls each unit in the PC 100 in accordance with the program stored in the hard disk 102, for example. The program for the operation of the CPU 101 may be stored in a device other than the hard disk 102. For example, the program may be stored in advance in a read-only memory (ROM) (not illustrated).

The input unit 105 receives a user operation, generates a control signal corresponding to the operation, and supplies the control signal to the CPU 101. For example, as an input device for receiving a user operation, the input unit 105 includes a character information input device, such as a keyboard, and a pointing device, such as a mouse or a touch panel. A touch panel is an input device capable of outputting information about coordinates of a position touched by the user on the input unit having a planar configuration, for example. The CPU 101 controls each unit in the PC 100 based on the control signal which is generated and supplied by the input unit 105 corresponding to the user operation performed on the input device. In this way, the CPU 101 can cause the PC 100 to execute an operation corresponding to the user operation.

The display control unit 104 outputs a display signal for displaying a video to a display (display unit) 110. For example, the CPU 101 generates a display control signal in accordance with a program and supplies the display control signal to the display control unit 104. Based on the display control signal, the display control unit 104 generates a display signal and outputs the generated display signal to the display 110. For example, based on the display control signal generated by the CPU 101, the display control unit 104 displays a graphical user interface (GUI) screen on the display 110. In addition, the CPU 101 can perform control to switch the mode setting between a display mode for displaying a two-dimensional video on the display 110 and a display mode for displaying a three-dimensional video on the display 110, based on a user instruction or automatically. The display control unit 104 outputs to the display 110 a display signal corresponding to the display mode setting controlled by the CPU 101.

When displaying a three-dimensional video, the display control unit 104 transmits a signal indicating whether a right-eye video is displayed or a left-eye video is displayed to a synchronization signal output unit 122 according to the screen display.

Based on the signal received from the display control unit 104, the synchronization signal output unit 122 determines whether the display 110 displays the left-eye video or the right-eye video and transmits a synchronization signal to glasses 123 to cause the glasses 123 to control the shutters thereon. The synchronization signal can be transmitted any methods such as infrared communication, wireless communication, and wired communication.

The glasses 123 control a corresponding shutter in accordance with the synchronization signal received from the control synchronization signal output unit 122. Since the shutters corresponding to the respective right and left eyes are alternately turned on and off, only an eye can view the corresponding displayed video.

If a touch panel is used as the input unit 105, the input unit 105 and the display 110 can be configured integrally. For example, the touch panel is configured so that light transmissivity does not negatively affect the video displayed by the display 110, and the touch panel is attached to an upper layer of the display surface of the display 110. In addition, the input coordinates on the touch panel and the display coordinates on the display 110 are associated with each other. In this way, a GUI that gives a user a feeling as if the user can directly operate the screen displayed on the display 110 can be configured.

An external storage medium 108 such as compact disc (CD) or a digital versatile disc (DVD) can be mounted in the drive unit 106. Based on the control by the CPU 101, the drive unit 106 can read and write data from and in the mounted external storage medium 108. The external storage medium 108, which can be mounted in the drive unit 106, is not limited to a disk recording medium such as a CD or a DVD. For example, a nonvolatile semiconductor memory such as a memory card may be mounted in the drive unit 106.

The data output unit 120 outputs three-dimensional audio and video signals and a two-dimensional video signal to the TV 300 via a connection unit 121. According to the present exemplary embodiment, the data output unit 120 transmits audio and video signals compatible with the HDMI standard.

The connection unit 121 is connected to the connection cable 200. According to the present exemplary embodiment, the connection unit 121 is a connector compatible with the HDMI standard.

While HDMI is used for connection between the PC 100 and the TV 300, an arbitrary connection means other than HDMI may be used, as long as three-dimensional and two-dimensional audio and video signals can be transmitted. For example, institute of electrical and electronic engineers (IEEE) 1394 or universal serial bus (USB) may be used.

While the PC 100 uses the active shutter method as the three-dimensional video display method in the present exemplary embodiment, the PC 100 may alternatively use the polarization method, or the spectroscopic method. Further, the parallax barrier method or the lenticular method can be used.

In addition, while the TV 300 uses the active shutter method as the three-dimensional video display method in the present exemplary embodiment, the TV 300 may alternatively use the polarization method, or the spectroscopic method. Further, the parallax barrier method or the lenticular method can be used.

Figure 3:
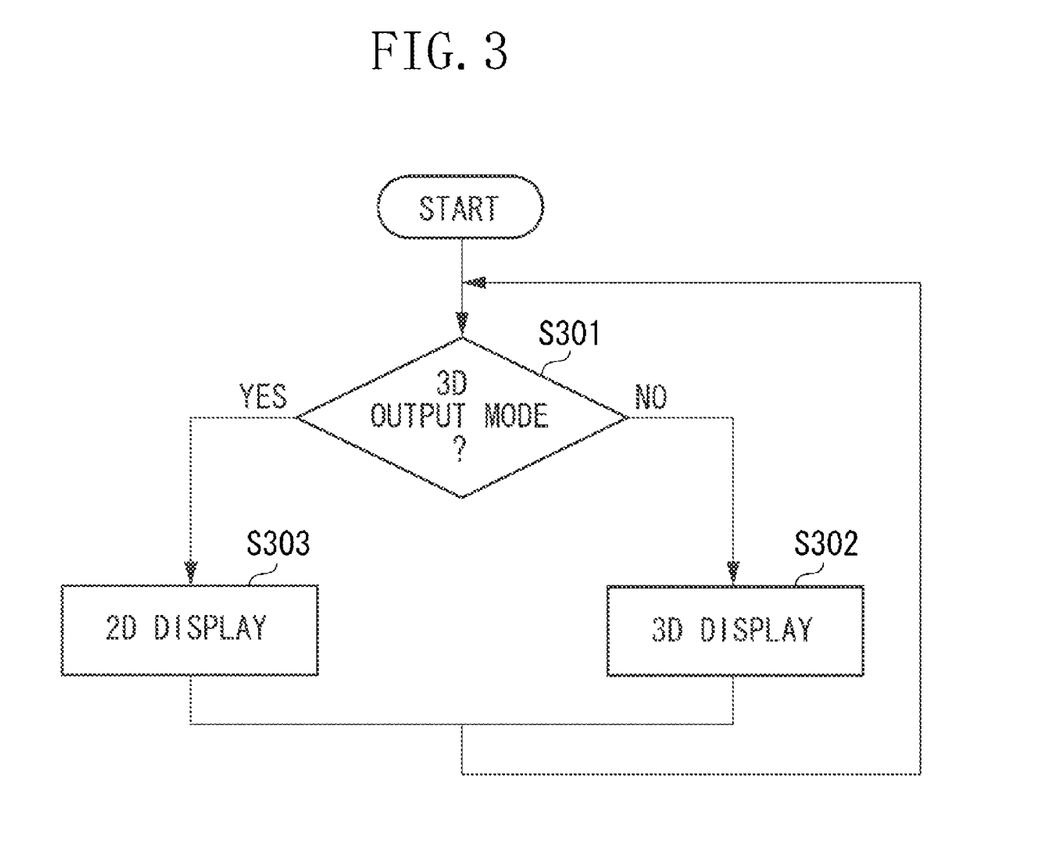
FIG. 3 is a control flow chart of the PC according to the first exemplary embodiment.

Next, display switching control performed by the PC 100 according to the present exemplary embodiment will be described with reference to a flow chart in FIG. 3. Based on this control, the PC 100 switches display between the three-dimensional display and the two-dimensional display.

In step S301, the CPU 101 determines whether the PC 100 is connected to the TV 300 and is in a mode for outputting a three-dimensional video to the TV 300.

When the CPU 101 receives an instruction for outputting a three-dimensional video, which is input by the user via the input unit 105, the CPU 101 starts transferring a three-dimensional video signal to the data output unit 120. Thus, the shift to the mode for outputting the three-dimensional video is implemented. The three-dimensional video signal is recorded in the hard disk 102 or the external storage medium 108 inserted into the drive unit 106. Alternatively, the CPU 101 may generate the three-dimensional video signal by converting two-dimensional video data stored in the hard disk 102 or in the external storage medium 108 inserted into the drive unit 106 into three-dimensional video data.

If the CPU 101 determines that the PC 100 is not in the mode for outputting a three-dimensional video (NO in step S301), the operation proceeds to step S302. If the CPU 101 determines that the PC 100 is in the mode for outputting a three-dimensional video (YES in step S301), the operation proceeds to step S303.

In step S302, the CPU 101 causes the display 110 to display the three-dimensional video, and the synchronization signal output unit 122 outputs a synchronization signal to the glasses 123.

If, prior to step S301, a display mode for displaying a two-dimensional video has already been set to the display 110, the CPU 101 controls the display control unit 104 to automatically change the setting of the display mode to the mode for displaying a three-dimensional video.

To implement three-dimensional display, the CPU 101 issues an instruction to execute three-dimensional display to the display control unit 104. Then, the display control unit 104 synthesizes input right-eye and left-eye video signals and causes the display 110 to display the signals as a three-dimensional video.

In step S303, the CPU 101 causes the display 110 to display a two-dimensional video.

If, the PC 100 is in the display mode for causing the display unit to display a three-dimensional video, the CPU 101 controls the display control unit 104 to change the setting of the display mode to the display mode for displaying a two-dimensional video.

Based on this control, when one of the TV 300 and the PC 100 is in the mode for displaying a three-dimensional video, the other one displays a two-dimensional video. If both of the devices use the different three-dimensional video methods and simultaneously display a three-dimensional video, a user cannot properly view the three-dimensional video. However, the present exemplary embodiment can prevent such a case. According to the present exemplary embodiment, a user can properly view the display unit of the PC and the display portion of the TV 300 simultaneously.

Next, a second exemplary embodiment of the claimed invention will be described with reference to FIGS. 4 and 5.

Figure 4:
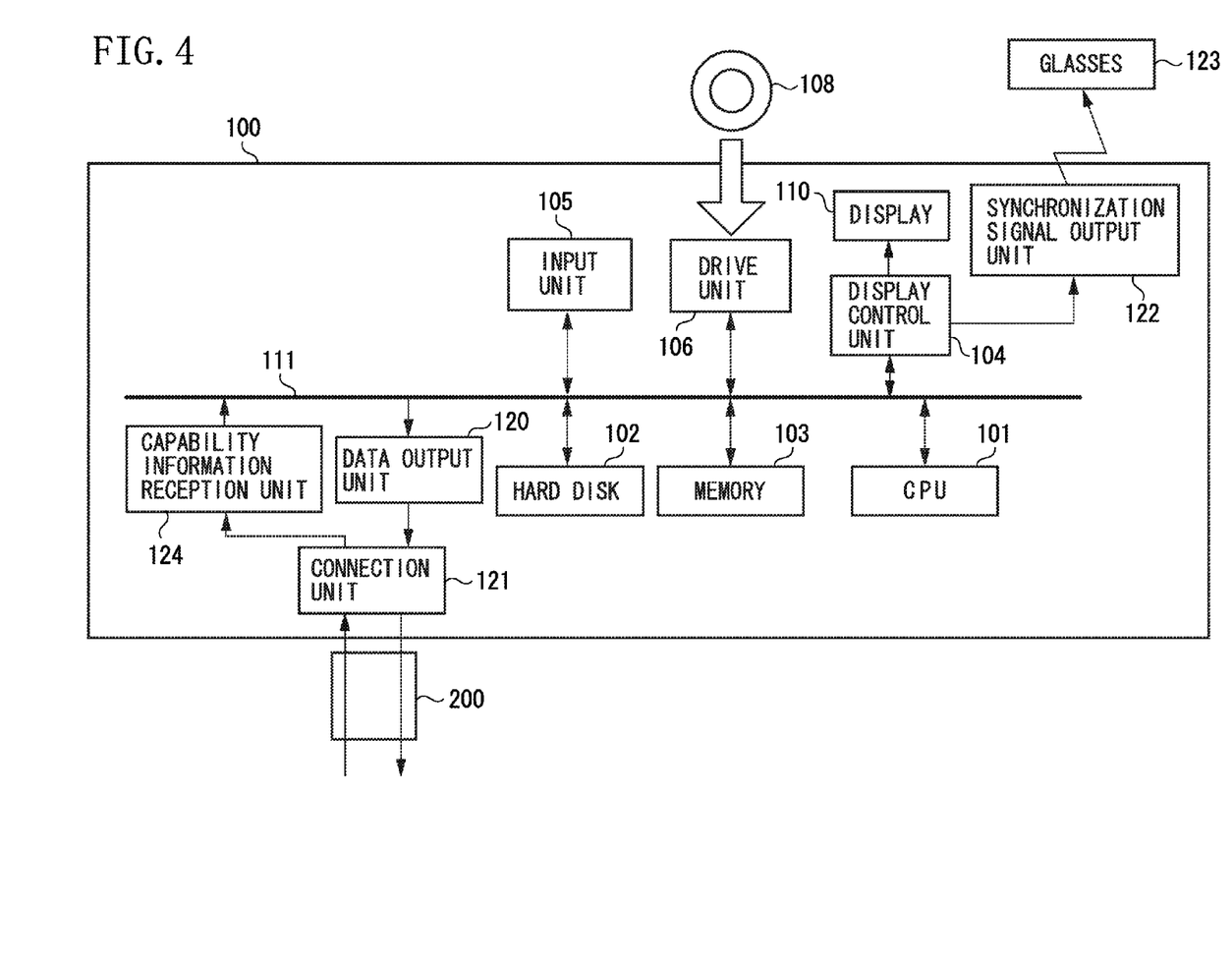
FIG. 4 is a block diagram of a PC according to a second exemplary embodiment.
Figure 5:
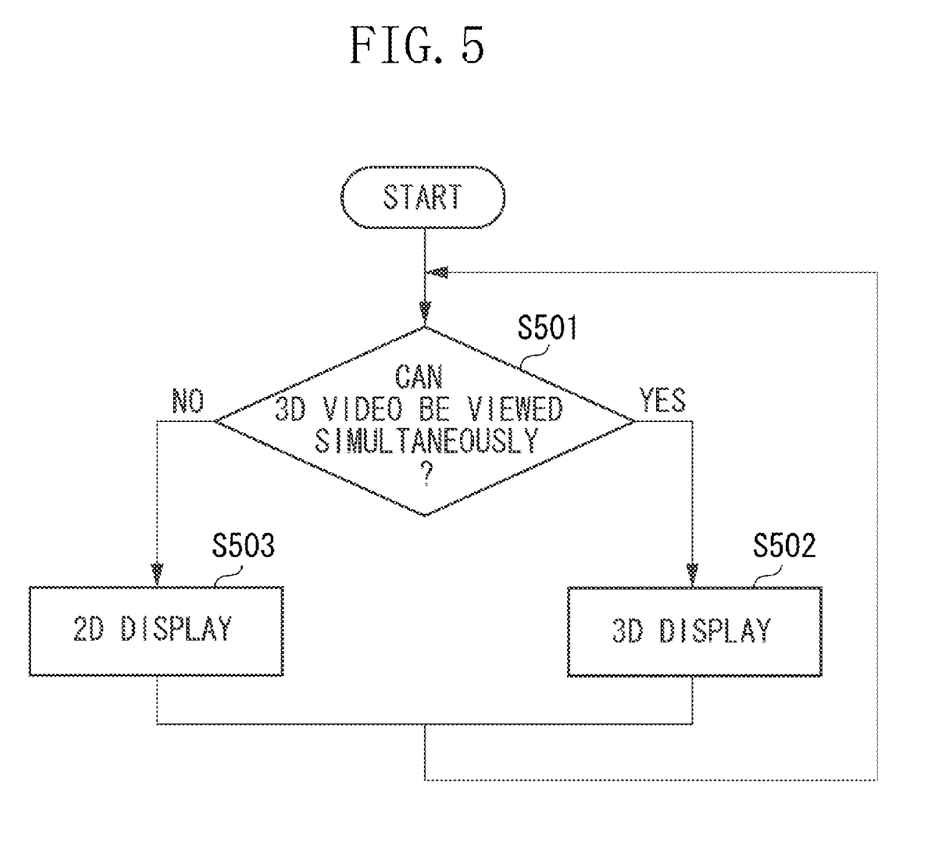
FIG. 5 is a control flow chart of the PC according to the second exemplary embodiment.

In FIGS. 4 and 5, portions identical to those according to the first exemplary embodiment are denoted by the same reference characters, and descriptions thereof are omitted.

As illustrated in FIG. 1 in the first exemplary embodiment, the configuration includes the PC 100 and the TV 300 which are connected to each other via the connection cable 200. The PC 100 transmits audio and video signals to the TV 300, and the TV 300 transmits capability information including a three-dimensional video display method of the TV 300, which is described below, to the PC 100.

According to the present exemplary embodiment, the connection cable 200 is an HDMI cable compatible with the HDMI standard. The HDMI cable includes an extended display identification data (EDID) line for transmitting the capability information, a CEC line for transmitting inter-device control commands, a +5V line for transmitting power source information, an HPD for transmitting connection detection information, and the like.

While HDMI is used for connection between the PC 100 and the TV 300 in the present exemplary embodiment, an arbitrary connection means other than HDMI may be used, as long as three-dimensional and two-dimensional audio and video signals can be transmitted. For example, IEEE 1394 or USB may be used.

FIG. 4 is a block diagram illustrating an example of the PC 100 according to the second exemplary embodiment of the claimed invention.

In FIG. 4, the CPU 101, the hard disk 102, the memory 103, the display control unit 104, the input unit 105, the drive unit 106, the data output unit 120, and a capability information reception unit 124 are connected to the internal bus 111. These units connected to the internal bus 111 can exchange data with each other via the internal bus 111.

The capability information reception unit 124 receives capability information about the TV 300 via the connection cable 200. According to the present exemplary embodiment, EDID compatible with the HDMI standard is used as the capability information. When the PC 100 and the TV 300 are connected to each other, the TV 300 transmits EDID to the PC 100 via the EDID line included in the connection cable 200. After receiving EDID, the capability information reception unit 124 notifies the CPU 101 of the content of EDID, and the CPU 101 records the capability information about the connected TV in the memory 103, the hard disk 102, the external recording medium 108, or the like. According to the present exemplary embodiment, the CPU 101 records the capability information in the memory 103. The capability information includes information indicating whether the TV 300 has three-dimensional video display capability, a three-dimensional video display method to be used, and the like. According to the present exemplary embodiment, a vendor-specific data block is used for transmission of a three-dimensional video display method via EDID.

In addition, in the present exemplary embodiment, EDID is used for transmission of the capability information. However, an arbitrary means may be used as long as the capability information about the TV 300 can be transmitted. For example, a CEC command defined by the HDMI standard may be used to transmit the capability information.

In addition, while the PC 100 uses the active shutter method as the three-dimensional video display method in the present exemplary embodiment, the PC 100 may alternatively use the polarization method, or the spectroscopic method. Further, the parallax barrier method or the lenticular method can be used.

In addition, while the TV 300 uses the active shutter method as the three-dimensional video display method in the present exemplary embodiment, the TV 300 may alternatively use the polarization method, or the spectroscopic method. Further, the parallax barrier method or the lenticular method can be used.

Next, display switching control performed by the PC 100 according to the claimed invention will be described with reference to a flowchart in FIG. 5. In this control, the PC 100 switches display of the TV 300 between the three-dimensional display based on the three-dimensional display method and the two-dimensional display.

When the PC 100 is connected to the TV 300 via the connection cable 200 to output a three-dimensional video to the TV 300, the CPU 101 starts the operation illustrated in the flow chart in FIG. 5.

In step S501, the PC 100 acquires the capability information from the TV 300 and records the acquired capability information in the memory 103. In addition, the CPU 101 refers to the EDID of the TV 300 recorded in the memory 103 to determine the three-dimensional video display method of the TV 300.

Based on the determination result of the three-dimensional video display method of the TV 300, if the CPU 101 determines that a user can view a three-dimensional video simultaneously displayed on the PC 100 and the TV 300 (YES in step S501), the operation proceeds to step S502. Whereas if not (NO in step S501), the operation proceeds to step S503.

For example, the CPU 101 determines that a user can view a three-dimensional video simultaneously displayed on the PC 100 and the TV 300 in step S501, if both the PC 100 and the TV 300 use the three-dimensional video display methods that allow the user to view a three-dimensional video with the naked eyes or if the user can view a three-dimensional video displayed on both the PC 100 and the TV 300 through the same glasses.

Even if one of the PC 100 and the TV 300 uses the three-dimensional video signal display method that involves use of glasses and the other one uses the method that allows the user to view a three-dimensional video with the naked eyes, if the user can view the three-dimensional video that can be viewed with the naked eyes through the glasses, the CPU 101 may determine that the user can view a three-dimensional video simultaneously displayed on the PC 100 and the TV 300.

In step S502, the display 110 displays a three-dimensional video, and the synchronization signal output unit 122 outputs a synchronization signal to the glasses 123.

If, prior to step S502, the display mode for displaying a two-dimensional video has already been set to the display 110, the CPU 101 controls the display control unit 104 to automatically change the setting of the display mode to the mode for displaying a three-dimensional video.

To implement three-dimensional display, the CPU 101 issues an instruction to execute the three-dimensional display to the display control unit 104. Then, the display control unit 104 synthesizes input right-eye and left-eye video signals and causes the display 110 to display the signals as a three-dimensional video.

In step S503, the CPU 101 causes the display 110 to display a two-dimensional video.

If the PC 100 is in the display mode for causing the display unit to display a three-dimensional video, the CPU 101 controls the display control unit 104 to change the setting of the display mode to the display mode for displaying a two-dimensional video.

If the CPU 101 determines that the TV 300 uses the three-dimensional video display method that allows the user to simultaneously view a three-dimensional video signal of the display apparatus, the CPU 101 continuously allows the display apparatus to display a three-dimensional video. Whereas if not, the CPU 101 causes the display apparatus to display a two-dimensional video. According to this configuration, convenience of users can be improved.

According to the present exemplary embodiment, the TV 300 transmits the capability information through communication. However, alternatively, a user may input the capability information about the TV 300 to the PC 100 and the CPU 101 may acquire the capability information. Further, a list of three-dimensional video display capabilities corresponding to types of external devices may be stored in a memory in advance, and the PC 100 can acquire the three-dimensional video display capability of an external device by reading the information from the memory. Thus, the CPU 101 functions as an acquisition unit for acquiring three-dimensional video display capabilities of external devices through communication, user input, or previously stored information.

Aspects of the claimed invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the claimed invention has been described with reference to exemplary embodiments, it is to be understood that the claimed invention is not limited to the disclosed exemplary embodiments. The scope of the following claims is to be accorded the broadest interpretation so as to encompass all modifications, equivalent structures, and functions.

This application claims priority from Japanese Patent Application No. 2011-195060 filed Sep. 7, 2011, which is hereby incorporated by reference herein in its entirety.

What is claimed is:

1. A display apparatus comprising:
   a display unit;
   a control unit configured to select either a first display mode for causing the display unit to display a three-dimensional video or a second display mode for causing the display unit to display a two-dimensional video; and
   a connection unit configured to connect the display apparatus to an external apparatus,
   wherein, the control unit sets either the first display mode or the second display mode according to a video display method of the external apparatus, and if the display apparatus outputs a three-dimensional video to the external apparatus in a state connected to the external apparatus via the connection unit, the control unit sets the second display mode.

2. The display apparatus according to claim 1, further comprising:
   an acquisition unit configured to acquire information about the video display method of the external apparatus,
   wherein the control unit sets either the first display mode or the second display mode according to the video display method acquired by the acquisition unit.

3. The display apparatus according to claim 2,
   wherein, if the video display method of the external apparatus is a three-dimensional video display method involving use of glasses, the control unit sets the second display mode.

4. The display apparatus according to claim 3,
   wherein the three-dimensional video display method involving use of glasses is at least an active shutter method, a polarization method, or a spectroscopic method.

5. The display apparatus according to claim 1,
   wherein, if the display apparatus is connected to the external apparatus while the display unit displays a three-dimensional video in the first display mode, the control unit changes a setting to the second display mode.

6. The display apparatus according to claim 1,
wherein, if the external apparatus and the display apparatus use the same three-dimensional video display method or if glasses for viewing a three-dimensional video on the external apparatus can be used to view a three-dimensional video on the display apparatus, the control unit sets the first display mode.

7. A method for controlling a display apparatus including a connection unit configured to connect the display apparatus to an external apparatus and a display unit configured to display a three-dimensional video, the method comprising:
selecting either a first display mode for causing the display unit to display a three-dimensional video or a second display mode for causing the display unit to display a two-dimensional video;
detecting connection to the external apparatus via the connection unit; and
setting either the first display mode or the second display mode according to a video display method of the external apparatus, and setting the second display mode if a three-dimensional video is output to the external apparatus after connection to the external apparatus is detected.

8. The method according to claim 7, further comprising:
acquiring information about the video display method of the external apparatus; and
setting either the first display mode or the second display mode according to the acquired video display method.

9. The method according to claim 7, further comprising:
changing a setting to the second display mode, if connection to the external apparatus is detected while the display unit displays a three-dimensional video in the first display mode.

10. The method according to claim 7, further comprising:
setting the first display mode, if the external apparatus and the display apparatus use a same three-dimensional video display method or if glasses for viewing a three-dimensional video on the external apparatus can be used to view a three-dimensional video on the display apparatus.

* * * * *